(12) United States Patent
Weil

(10) Patent No.: US 7,218,267 B1
(45) Date of Patent: May 15, 2007

(54) SYSTEM OF SUBTERRANEAN ANOMALY DETECTION AND REPAIR USING INFRARED THERMOGRAPHY AND GROUND PENETRATING RADAR

(76) Inventor: Gary J. Weil, 111 Marine La., St. Louis, MO (US) 63146

( * ) Notice: Subject to any disclaimer, the term of this patent is extended or adjusted under 35 U.S.C. 154(b) by 0 days.

(21) Appl. No.: 11/442,508

(22) Filed: May 26, 2006

Related U.S. Application Data

(60) Provisional application No. 60/685,338, filed on May 27, 2005.

(51) Int. Cl.
   *G01S 13/86* (2006.01)
   *G01S 13/89* (2006.01)

(52) U.S. Cl. .................................... 342/22; 250/341.1

(58) Field of Classification Search ................. 342/22; 250/340, 341.1, 341.7, 341.8; 374/45
   See application file for complete search history.

(56) References Cited

U.S. PATENT DOCUMENTS

| 4,910,593 | A | | 3/1990 | Weil | |
|---|---|---|---|---|---|
| 5,166,789 | A | * | 11/1992 | Myrick | 348/144 |
| 5,818,951 | A | * | 10/1998 | Schivley | 382/100 |
| 6,701,647 | B2 | * | 3/2004 | Stump | 342/22 |
| 2003/0010919 | A1 | * | 1/2003 | DiMarzio et al. | 250/341.1 |
| 2003/0193429 | A1 | * | 10/2003 | Campana et al. | 342/22 |

OTHER PUBLICATIONS

Martin Roubal, "Non-Destructive testing of ground and structural integrity of underground assets," Proc. Pipes Wagga Wagga Conf., Australia, Oct. 1999.*
Burn et al., "Pipe Leakage—Future Challanges and Solutions", Pipes Wagga Wagga, Australia 1999.*

* cited by examiner

*Primary Examiner*—Ian J. Lobo
(74) *Attorney, Agent, or Firm*—Peter S. Gilster; Greensfelder, Hemker & Gale, P.C.

(57) ABSTRACT

Method and system to identify, verify and remediate subterranean anomalies. Infrared (IR) thermographic scanning [10] of a selected surface area obtains image area data [12, 14] inferring such an anomaly. Ground penetrating radar (GPR) is used [22] at predetermined surface locations penetrates subterraneously to a depth including the anomaly, creating vertical dimension radar data [120] showing anomaly depth. Surface image IR data is correlated with GPR data to verify the anomaly and its vertical dimension and finds [124] a central location in the anomaly. Anomaly volume is predetermined from the area data and vertical-dimension data. Grout injected [26, 124] into the central location at first pressure secures the anomaly by surrounding the central location. After verifying centrally securement, more grout is injected [32, 126] into the anomaly region at second pressure at least as great as the first pressure until the total grout injected approximates the predetermined anomaly volume.

21 Claims, 9 Drawing Sheets

SYSTEM OF SUBTERRANEAN ANOMALY DETECTION AND REPAIR USING INFRARED THERMOGRAPHY AND GROUND PENETRATING RADAR

CROSS-REFERENCE AND CLAIM FOR PRIORITY

This application claims the priority of U.S. Provisional Application Ser. No. 60/685,338, filed May 27, 2005, of the present inventor, and entitled System of Subterranean Anomaly Detection and Repair Using Infrared Thermography and Ground Penetrating Radar.

BACKGROUND OF THE INVENTION

1. Field of the Invention

The invention relates to methods and systems for detection of subterranean anomalies such as voids and leaks by the use of infrared thermography and, more particularly, to methods and system for using infrared thermography together with ground penetrating radar to map subterranean leakage voids and to repair such voids and terminate such leakage in a very highly accurate, reliable, rapid and cost-effective manner.

2. Related Art

The present inventor is the patentee of Weil U.S. Pat. No. 4,910,593 issued Mar. 20, 1990, entitled System for Geological Defect Detection Utilizing Composite Video-Infrared Thermography, hereinafter referred to as the "Entech INSITE I System" or, more simply herein, the "Entech System." This patent, which is herein incorporated by reference, discloses a selectively mobile system with an infrared ("IR") scanner and video camera having a common area of focus and apparatus for detecting location permits detection of subterranean geological anomalies. Infrared and visual images are simultaneously successively recorded on videotape together with related location data and other relevant information. Video recorded infrared, video and location data are selectively captured on successive frames. Such frames are recorded for further analysis such as for determining the location and extent of subsurface anomalies such as leaks. That system, which is especially useful for mapping such anomalies along a route of travel, as across bridges, highways and other traffic surfaces such as paved surfaces or for examining surfaces that extend over elongated passages such as buried sewer and water lines, does not involve the additional use of ground penetrating radar, nor does it disclose methods for repair of anomalies detected by the use of the patented system. That system has advantageously led to the development of a pipeline leak and erosion void sensing and non-destructive testing.

3. Background Information

Most underground conduits or pipelines, whether they contain oil, chemicals, water, steam, gas or sewage, have a design life of 25 to 50 years, and when they begin to fail, they do so slowly at first through defective construction joints, corrosion and small cracks, and gradually progress to a catastrophic ending. This disastrous failure can be expensive in terms of both dollars and lives. But this scenario can be avoided. Planned maintenance can extend the life of all types of pipelines almost indefinitely, and regular testing of pipelines form the basis of economically viable restoration. In order for any testing technique to have widespread advantage, it needs to have the following qualities:

It must be accurate.
It must be non-invasive and non-destructive.
It must be able to inspect large areas and localized areas.
It must be efficient in terms of both labor and equipment.
It must be economical.
It should not be obtrusive to the surrounding environment.
It should not inconvenience the pipeline's users.

Chemical refineries, in particular, contain hundreds of miles of buried pipelines. In addition to a typical proliferation of oil and gas pipelines, such refineries have dozens of other types of pipelines such as sewer, water, steam, condensate, firewater and chemical pipelines that are often part of refinery support systems. Their integrity is crucial to the economic well-being and safety of these facilities.

Heretofore, project, typical buried sewer pipelines have been inspected by using closed circuit television, ultrasonic and/or sonic listening devices, or traveling inspection devices ("pigs"). None of these work satisfactorily on a refinery pipelines or sewers because: 1) Such lines may range in size from 1" to 72" diameter, for example; 2) They may be either gravity and pressurized systems; 3) They typically are buried beneath major pieces of refining equipment and mixed in with hundreds of other types of pipelines; and 4) Nearby pipelines and equipment produce prodigious amounts of auditory noise which interferes with testing. The lack of any accurate method or system of investigating the buried conduits, pipelines or sewer lines, for example, can lead to many unknowns that can significantly increase the rehabilitation costs of the traditional excavation and concrete encasement methods of repair.

Since 1998, the U.S. Environmental Protection Agency (EPA) has focused on refinery sewers as major ground and water pollution sources. In the wake of enforcement legal proceedings, refineries have increased inducement to inspect these sewer lines and other pipelines for leaks and to repair contamination sources therefrom.

SUMMARY OF THE INVENTION

The present patent application deals with a unique pipeline and subsurface testing program and can be herein termed the "Improved EnTech INSITE II System" to distinguish it from the EnTech INSITE I System and the new system and methodology may for brevity be called the "Improved System." It employs a fusion of multiple remote sensor data, coupled with innovative pipeline and subsurface repair/remediation methods to provide the qualities listed hereinabove.

Briefly, the described method and system are aimed at identification, verification and remediation of subterranean anomalies. Here described are procedures (one or more protocols) designed to locate and field mark surface temperature patterns indicative of subsurface fluid leaks including water, sewage, natural gas, other gases, hydrocarbons, and chemicals along with their erosion voids. Detection, mapping, characterizing, and field marking of anomalous areas is described. Procedures/protocols are described for leak sealing, erosion void filling, and saturated soil stabilization. Multiple forms of data input sensors are used. Visual imagery data is taken to ensure ground surface conditions in a selected area, which may be an area which is regular or irregular in nature, and which may be confined or elongate or have multiple parts, whether contiguous or not. The inventive system involves scanning a selected area, as by infrared thermography, above its surface to obtain area image data inferring the existence of an anomaly. Infrared imagery data is especially preferred for its ability to locate surface thermal patterns indicative of subsurface pipeline leaks, erosion voids and wet materials. Field anomaly marking is then carried out and may preferably include field marking of a grid to establish predetermined points for taking of radar data. This may include the surface application of paint marks denoting points of a grid.

Radar data is then taken by ground penetrating radar, which is used by positioning a radar unit or units at the predetermined grid points on the surface to penetrate a subterranean extent with radar to a depth to include an anomaly in question, thus creating a set of vertical dimension radar data, preferably three-dimensional data showing anomaly depth and shape. The ground penetrating microwave radar data locates from radar returns the subsurface dielectric conditions indicative, at least, of erosion voids and saturated subsurface materials.

The surface image data and ground penetrating radar are displayed, as by use of multiplexer to synchronize the different types of data and make it available for Individual or simultaneous display on a computer or video display monitor using quad type software together with display of location, site description, GPS, distance and position data, date, time and other descriptive data. The various data are stored for use, in analog or digital format, as on magnetic videotape, magnetic disk, computer hard drive or disk, video cassette recorder, optical disk, or data modules and devices of portable or convenient nature. The data is transmitted by wired or wireless means to the storage media.

The data is then analyzed. In any event, the visual data is correlated with the radar data to verify the existence of such anomaly and its vertical dimension and to determine a central location within the anomaly. Data analysis to provide such correlation make be carried out manually or by automated (e.g., software and/or hardware and/or firmware implemented) procedure using written code software and/or neural network hardware and/or software. The correlation determines the volume of the anomaly, such as a void or defect, or fluid-infiltrated region, on the basis of the two-dimension thermographic area data and the vertical-dimension radar data. Data analysis, as by the use of software, visualizes data illustrating subsurface solid areas, voids, and saturated materials. Field marking of erosion void centroids is then carried out. This may include the surface application of paint marks denoting the erosion void centroids at grade level. Subsurface voids may be visualized by use of the radar data and data analysis software as having a centroid having a measured distance below a centroid grade marker.

In the case of a pipeline leak characterized by a pipeline leak hope, the procedure then most preferably carried out at this point is injection of grout at low pressure to form a "healing bandage" over the pipeline leak hole. This is followed by rechecking of the leak with the IR thermography system sensors for quality control. Such quality control procedures for rechecking of the leak may most preferably include field repeat of visual data collection visual and repeat of infrared data collection, with collection also of text and related information appropriate to the data collection, as described above, including date, time and location data. Such quality control thus entails a retaking of visual imagery data to ensure ground surface conditions in the selected area.

Grout can then be injected. More specifically, grout is injected into the central location of the anomaly, i.e., erosion void centroids, at a preselected first pressure for securing the anomaly by surrounding its central location. After verifying that the anomaly is centrally secured, being in effect bandaging in the case of a pipeline leak, grout is further injected into the region of the anomaly grout at a preselected pressure, wherein the second pressure selection is a pressure at least as great as the first pressure, until the total amount of injected approximates the predetermined volume of the anomaly. Injection of high pressure grout has the benefit that it stabilizes wet subsurface materials. This second injection procedure is followed by rechecking of leak with IR system sensors for quality control.

Thus, among the several objects, advantages and features of the invention may be noted the provision of a relatively fast, economical, safe, efficient, accurate, and reliable system and method for detection and repair of subterranean anomalies, including leaks and voids; which system involves the fusion of sensing and mapping technology including infrared thermography and GPR, which is non-invasive, non-destructive and can be used even in the most congested subterranean conditions, as where there are sewer, water, steam, condensate, firewater and chemical pipelines overlaid at various levels, as may be characteristic of refineries and other chemical manufacturing and processing facilities, and which employs a methodology for securing the anomalies such as leaks and voids for assured remediation of them.

Among the further objects, advantages and features of the invention may be noted the provision of such systems and methods which can be used on various areas, and on various terrains, in either daytime or nighttime conditions, under a variety of weather and surface conditions; and which cause minimal inconvenience to personnel and to operations within or proximate the area in which subterranean anomalies are to be mapped and secured.

The Improved System provides state-of-the-art non-invasive technology that can serve as the basis for an overall sewer testing and repair system capable of locating sewer and other pipeline leaks and erosion voids in active and retired refinery systems; characterizing these anomalous areas as to composition, size, depth, and plume spread. The system methodology provides for repair and remediation of these subsurface areas with no inconvenience to the facility, its processes, or its personnel. As pipeline remediation, the new system is capable typical overall saving greater than 70% compared with traditional testing, excavation and repair techniques.

For use in carrying out nondestructive and noninvasive testing in such an inhospitable environment, the EnTech INSITE I System can be used to carry out infrared thermography-based pipeline leak and erosion void detection. Such system is capable of performing a multiphase testing process that fuses data from several sensors, including, for example: 0.3–0.7 μm visual image; 3–5 μm IR; 8–12 μm IR; microwave as a species of ground penetrating radar, at various possible frequencies; odometer and/or Global Positioning System (GPS) sensors.

The Improved System captures infrared and/or visual images, such by use of IR scanners, imagers, cameras or radiometers, including video or other digital or photo cameras and video camera images of surface areas below which there are suspected anomalies, such as a pipeline or sewer leak. Such surface image data is two-dimensional, and is preferably simultaneously successively recorded on videotape together with related location data (such as odometer or GPS data) and other relevant descriptive data, and time of day. A combination of infrared, video and location data and other relevant data, is selectively captured on successive frames. Said Weil U.S. Pat. No. 4,910,593 is illustrative of the recording of multiple forms of such data.

Ground penetrating radar (herein called GPR), as here employed, is a geophysical technology useful for high-resolution, subsurface investigations to relatively shallow depths, e.g., to depths to more than 30 meters, dependent upon geologic media, and employing high frequency pulsed electromagnetic waves (at frequencies generally from 10 MHz to more than 1000 MHz) to acquire subsurface information. Energy is propagated from grade level into subterranean geologic media. The electromagnetic radiation (e.g., as microwaves) is reflected to transmitting and receiving elements of the GPR sensors by subsurface boundaries or regions having contrasting electrical properties.

By using a combination of visual, infrared thermographic and referencing sensors, the Improved System is capable of detecting one or more anomalous surface (e.g., as at grade level) temperature area patterns indicative of or signaling subsurface pipeline leaks and their probable erosion voids. Field data collection is performed such as during nighttime or other off-peak work hours so as not to inconvenience either refinery personnel or interfere with process equipment. Subsequently using invasive and destructive boring and sampling techniques, if necessary, the possible plural anomalous areas are further analyzed to confirm the general nature of the leak. For example, some anomalous areas may be caused by sewer pipeline leaks, while others may be caused by other fluids, such as firewater pipeline leaks. The Improved System can distinguish, for example, between sewer and water system leaks, permitting remediation of only leaks that are of important concern.

The combination of two-dimensional surface image data and vertical dimension GPR data allow confirmation of voids and determination of void volume.

Upon the nondestructive determination and location of one or more leaks that are of important concern, the Improved System then carried forward to remediation steps involving most preferably grouting to repair leak of importance. For example, the system first distinguishes between a sewer pipeline leak and a water pipeline leak of little importance, or which may safely be ignored for a period. The grouting methodology is thus first applied to the sewer pipeline leak.

The grouting steps of the Improved System involve injecting a grout composed of such as expansive urethane. On a single sewer anomaly, for example, grout is injected at predetermined low pressure. Infrared thermography (and optionally also microwave or ground penetrating radar data) is then used again to determine the extent to which the leak is secured. If the leak is not secured, additional grouting, which may be at similar or higher pressure is carried out. Grouting is continued until the volume of the subterranean anomaly or anomalies is filled with grout.

An advantage in the use of the Improved System is that, within the vicinity of the anomalous area being detected and secured, the use of ground penetrating radar, employing microwave sensors, subsurface voids, saturation and soil conditions can be mapped to a substantial depth, such as to a depth of 15 feet below grade.

Systematic fusion of infrared thermographic surface image and subterranean ground penetrating microwave radar testing techniques, combined with subterranean void grouting at selected pressures, according to the present disclosure, can effectively seal a variety of subterranean anomalies, especially from those in which fluids have been leaking, such as pipelines or various other lines or sewers, and can effectively fill erosion voids caused by such leakage, and so also stabilize saturated soils supporting the pipeline or other line and above-ground traffic. Such grouting may be performed during both daytime and nighttime hours to reduce traffic, personnel and process interactions.

Other objects and features will be apparent or are pointed out in the following description.

Figure 1A:
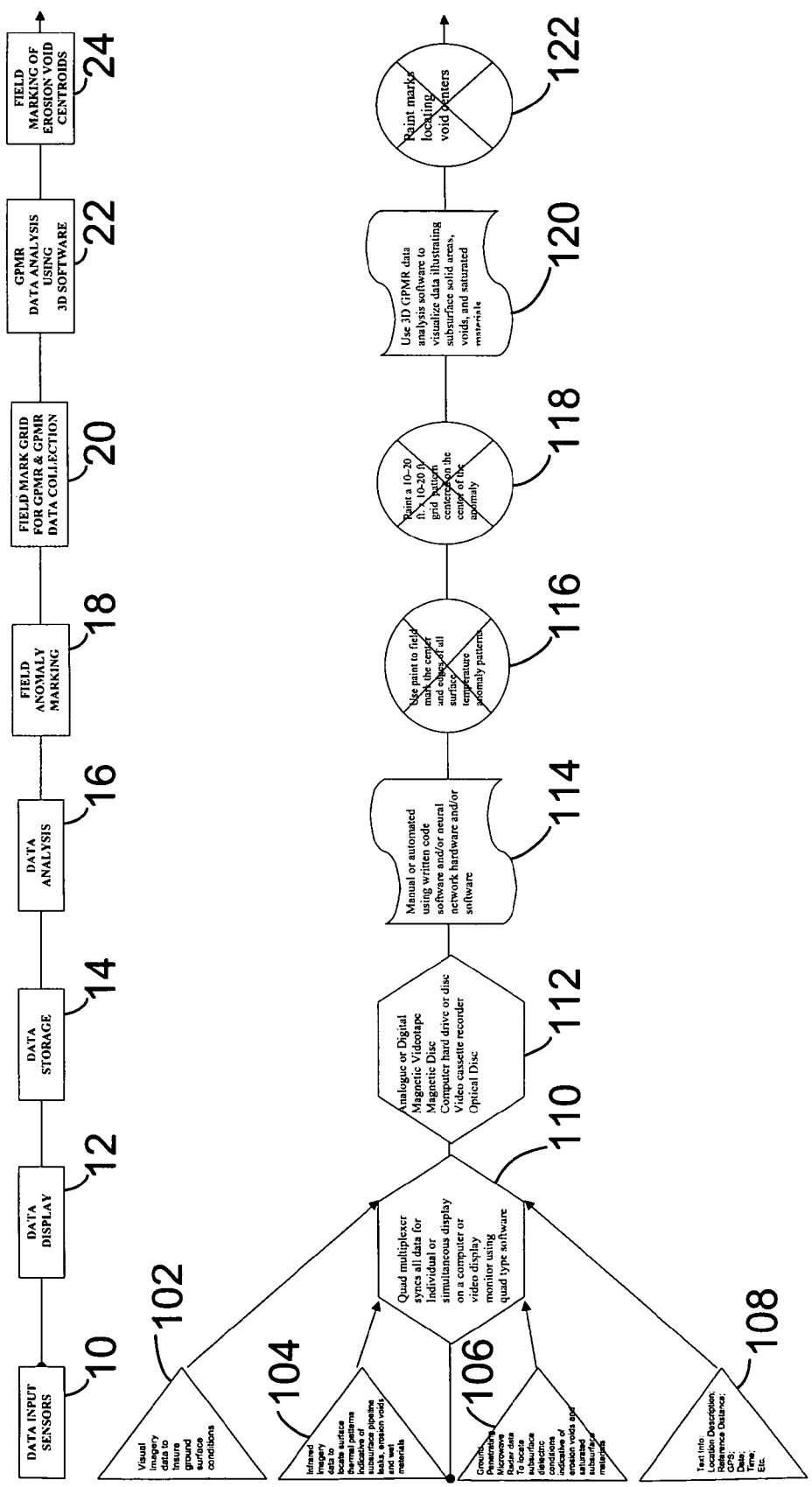
FIG. 1A is a first part of a flow diagram summarizing procedures to locate and field mark surface temperature patterns indicative of subsurface fluid leaks including water, sewage, natural gas, other gases, hydrocarbons, and chemicals along with their erosion voids, all being subterranean anomalies, in accordance with the present invention.
Figure 1B:
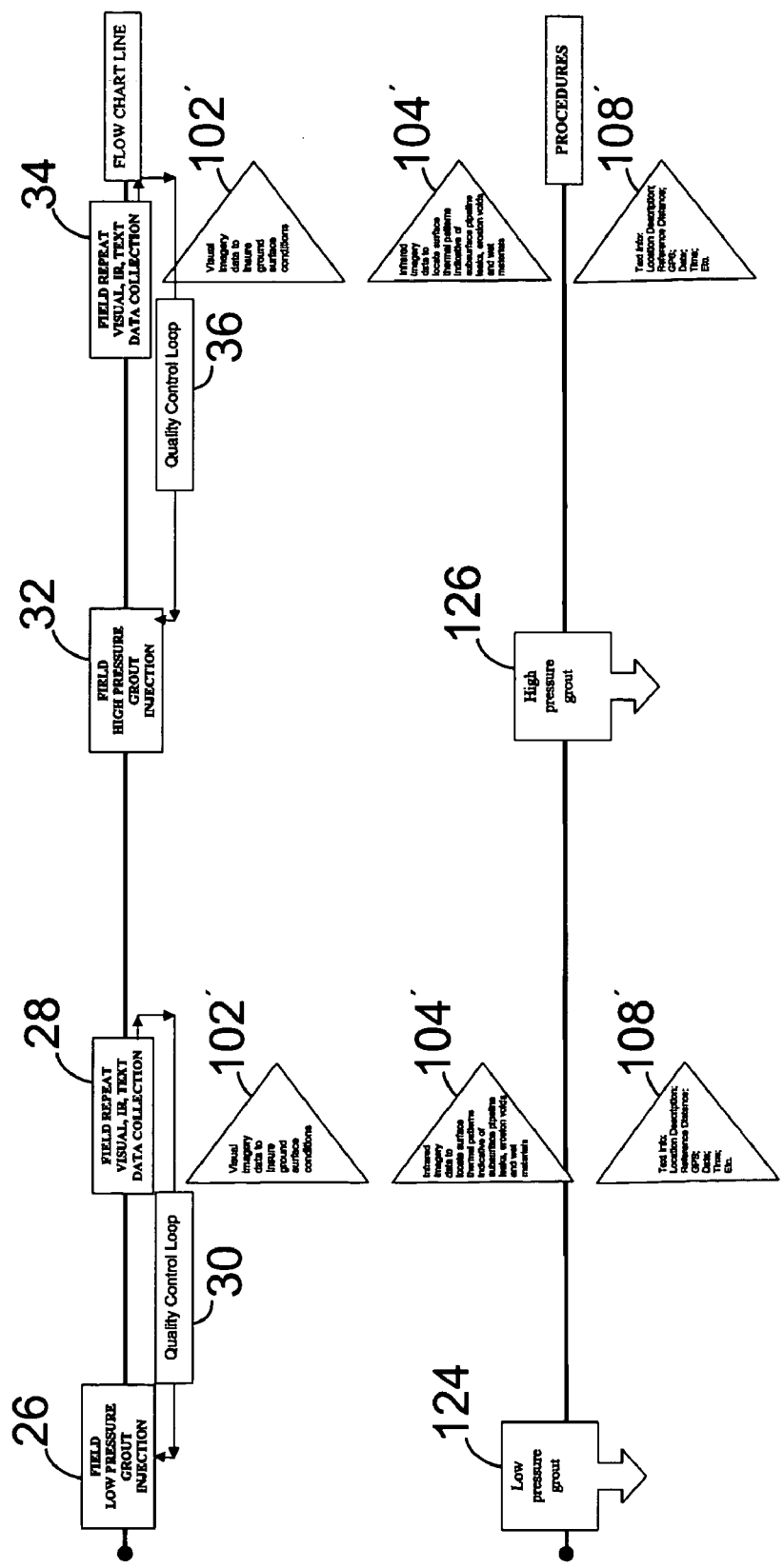
FIG. 1B is a second part or continuation of the flow diagram of FIG. 1A and summarizing procedures for detection, mapping, characterizing and field marking of anomalous areas for leak sealing, erosion void filling, and saturated soil stabilization, and further, summarizing procedures of injection of grout to form a "healing BAND AID" bandage over a pipeline leak hole, followed by rechecking of the leak with infrared thermography system sensors for quality control, as well as summarizing procedures of inspection of high pressure grout to stabilize wet subsurface materials, followed by recheck of the leak with infrared thermography system sensors for quality control, all in accordance with the present invention.

The drawings FIGS. 1A and 1B which make up parts of FIG. 1 each have three lines or tracks representing respectively a description line, a flow chart line and a procedures description line or track and it will be apparent that FIG. 1B continues from FIG. 1A along the three lines or tracks.

Figure 2:
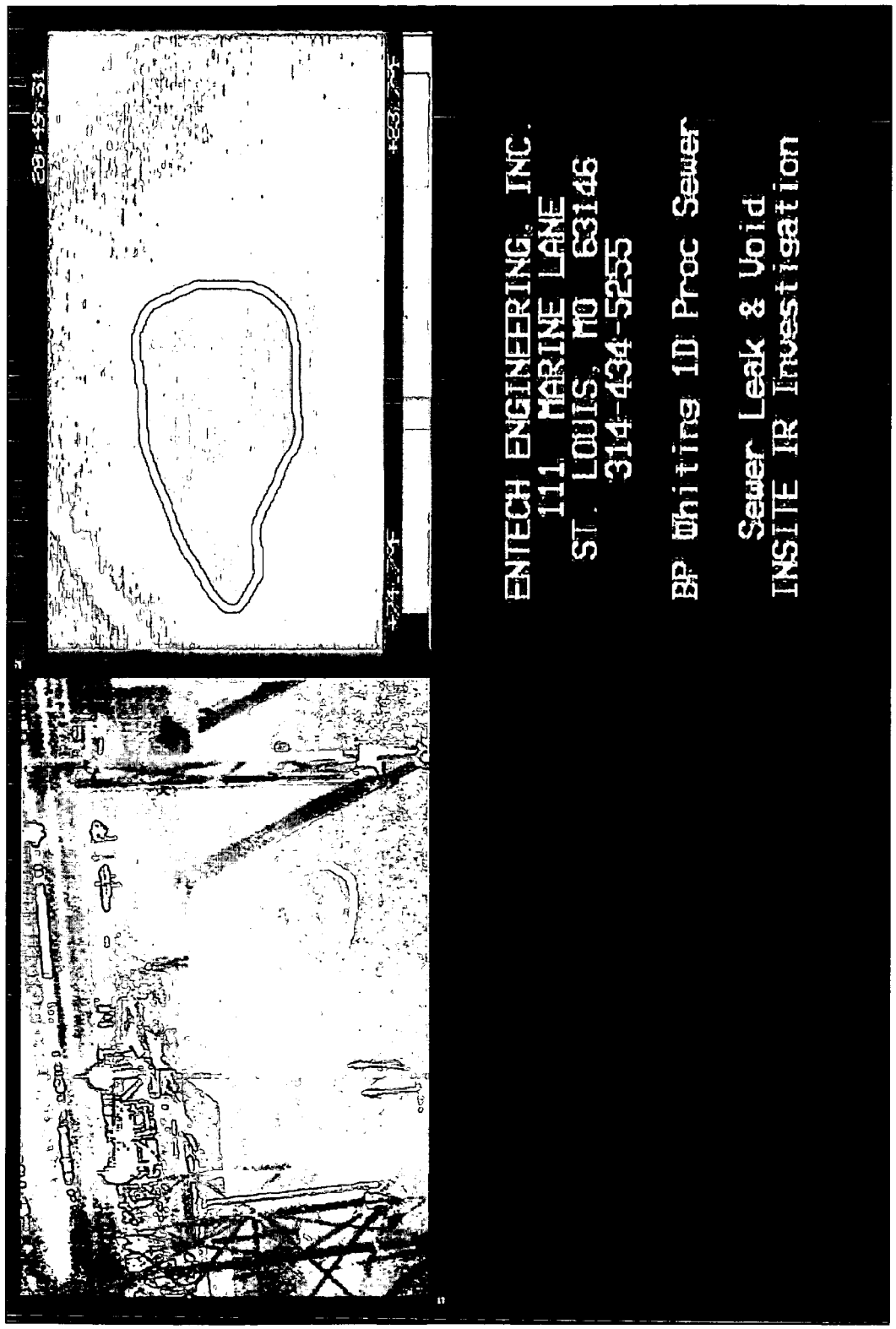

FIG. 2 is a multiplexed simultaneous computer screen display of infrared thermography data, ground penetrating radar data, and site and other data, as such data displayed after its collection and during or after storage.

Figure 3:
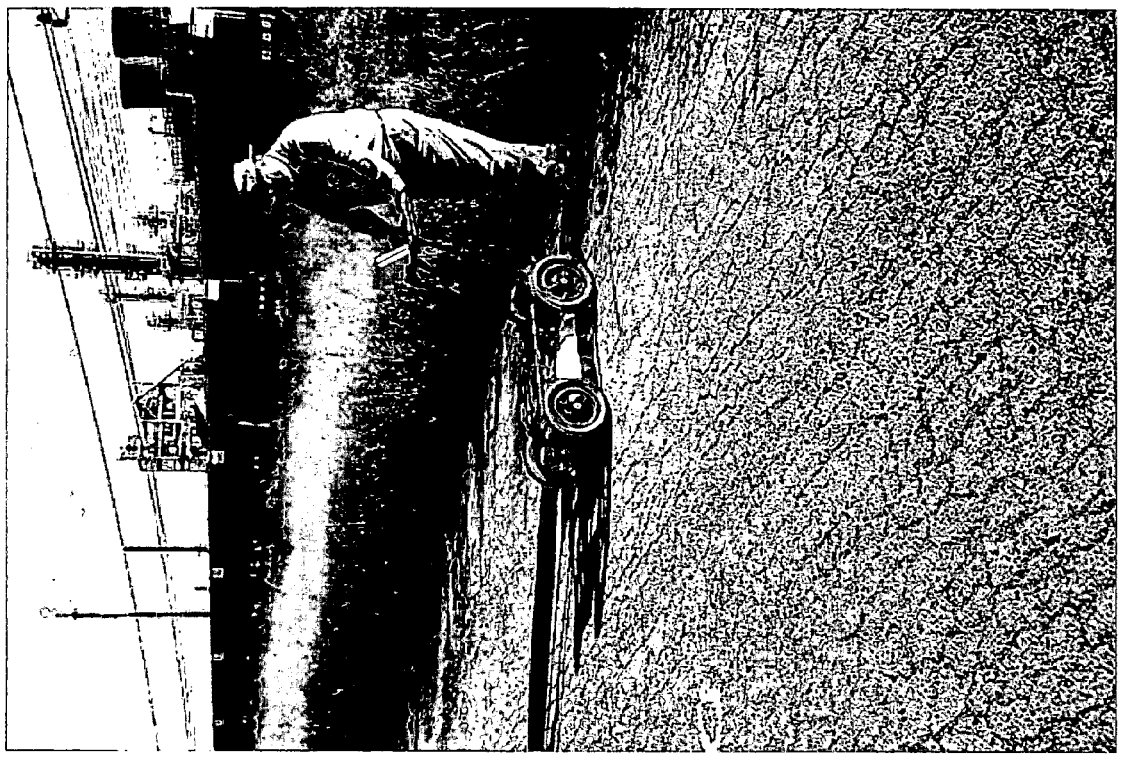
Figure 4A:
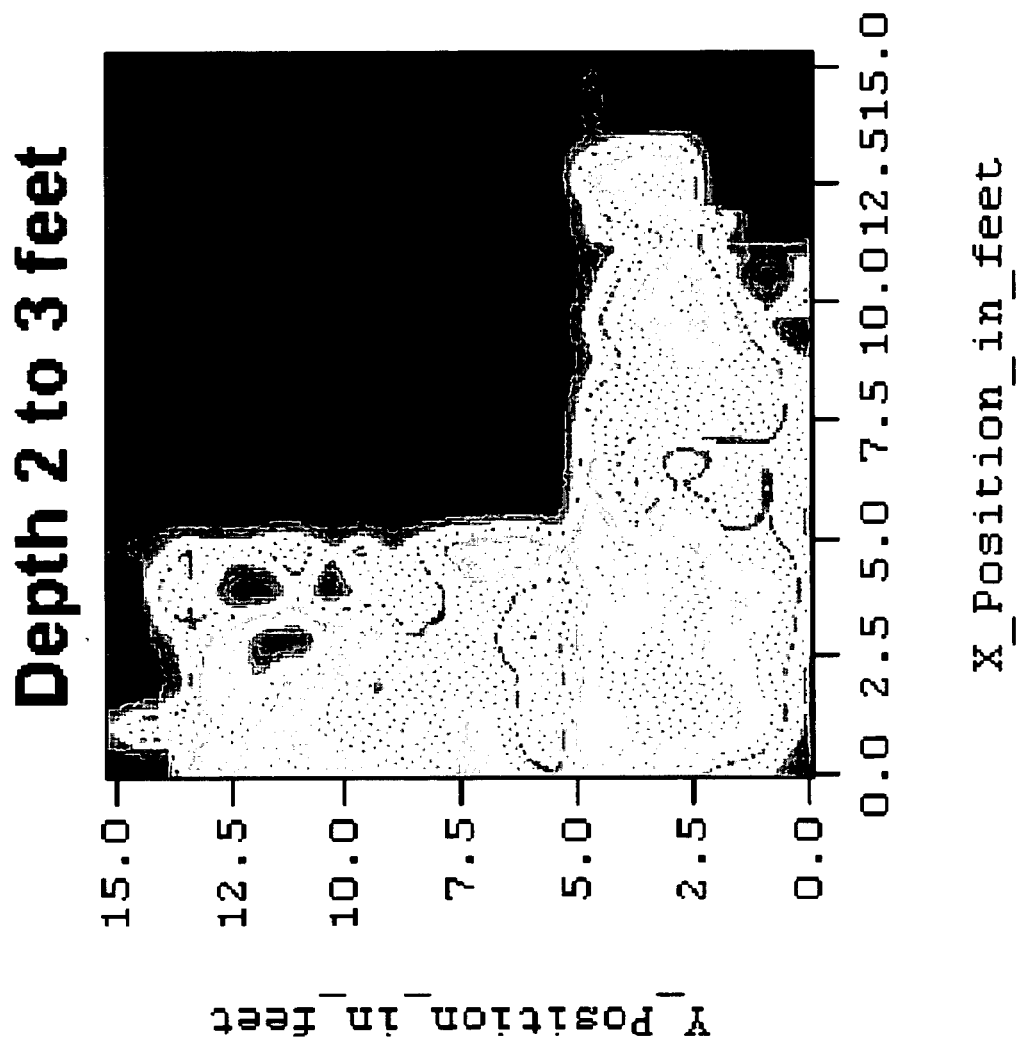
Figure 4B:
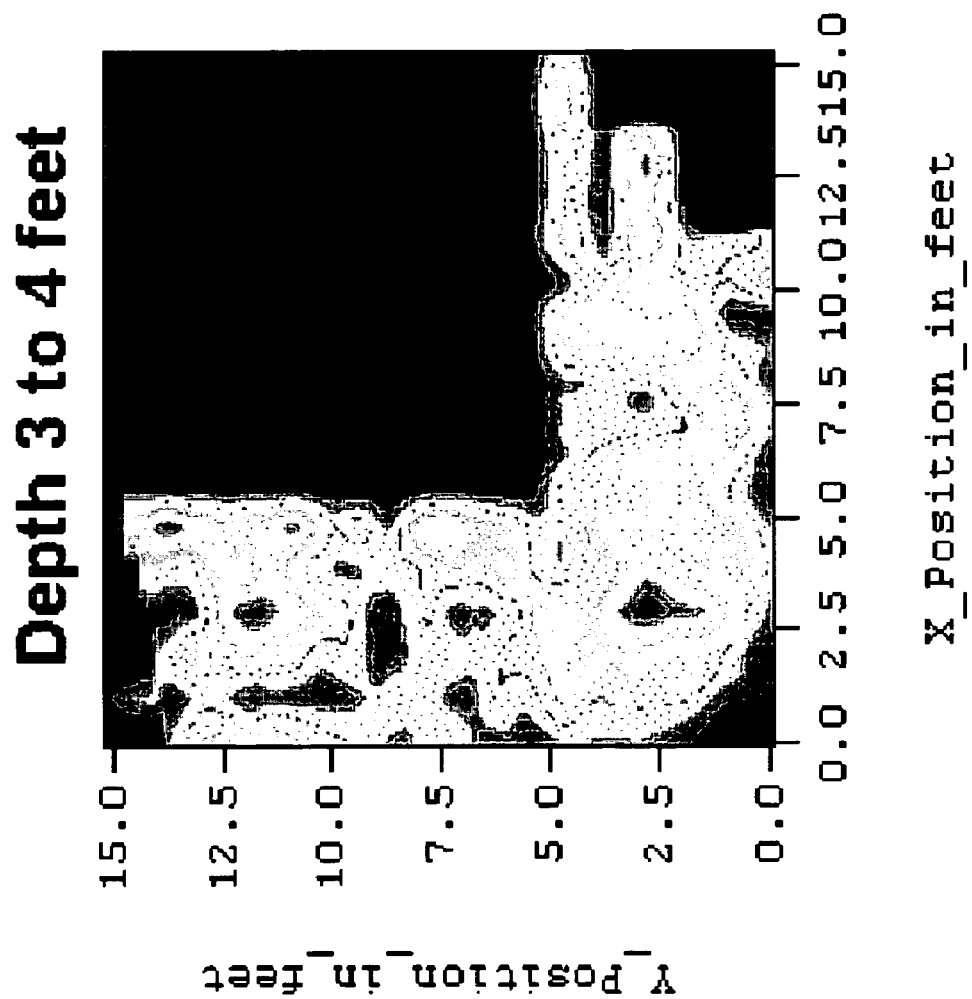
Figure 4C:
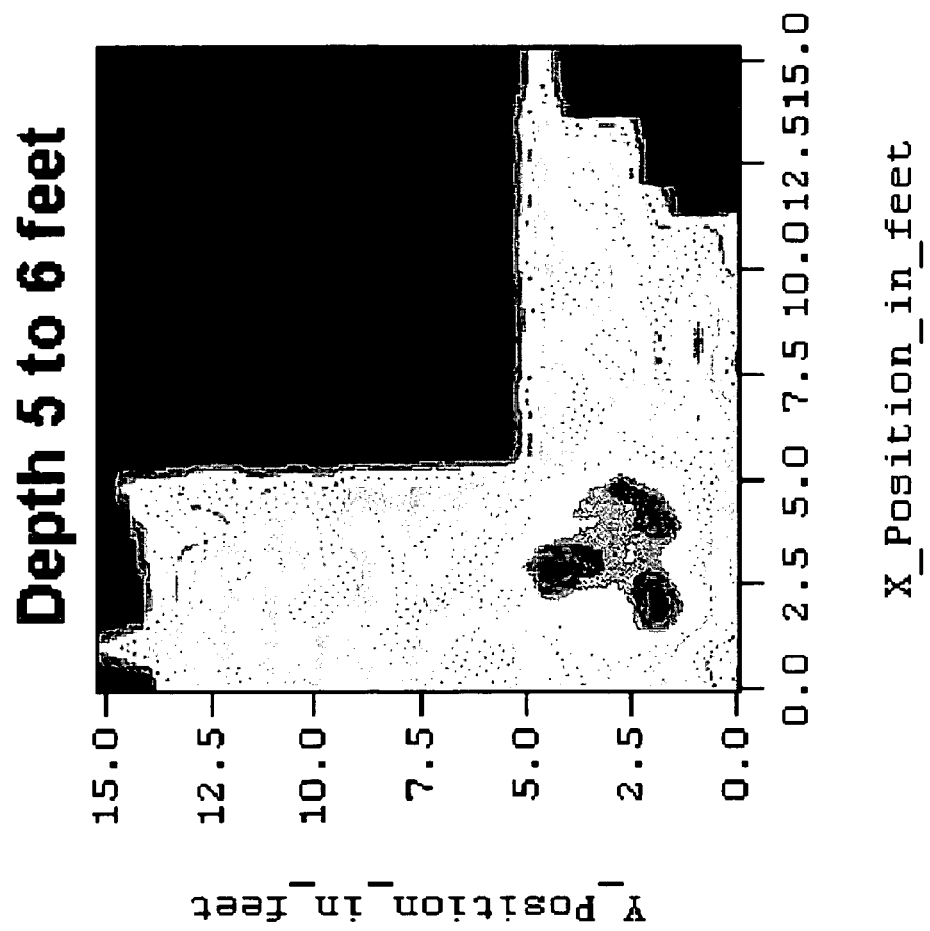
Figure 4D:
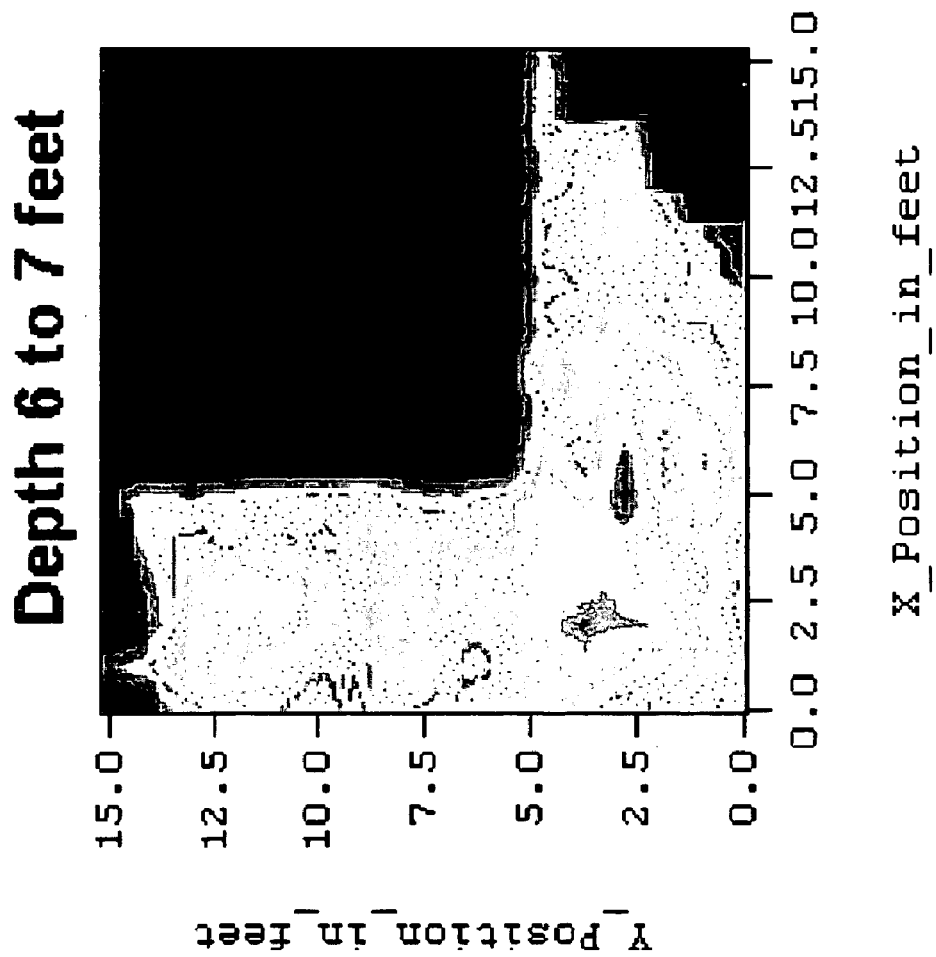
Figure 4E:
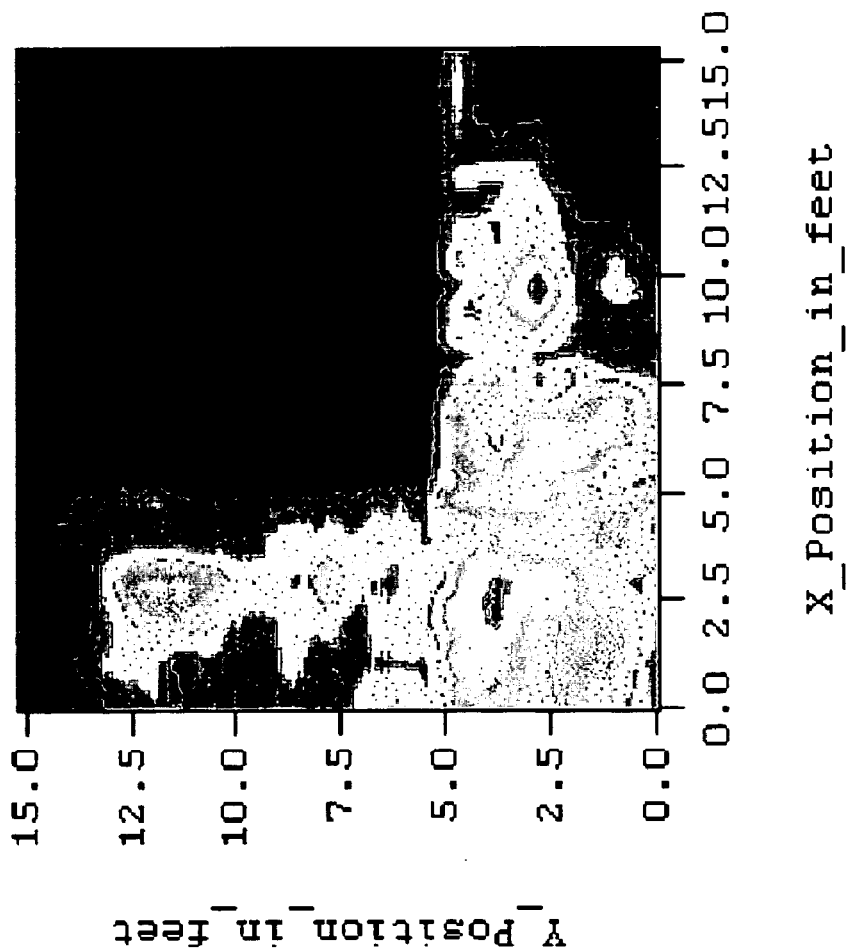

FIG. 3 is a photograph showing developmental field marking of grip of predetermined points for use of ground penetrating radar and ground penetrating radar data collection.

FIGS. 4A through 4E are ground penetrating radar data images realized from microwave radar reflections returned from subterranean media, and representing three dimensional data of subterranean media in which there are anomalies.

DESCRIPTION OF PRACTICAL EMBODIMENTS

Referring to the drawings, an Improved System of the invention uses a hierarchy or fusion of systematic features and methodology to identify and remediate subterranean anomalies which lie beneath the surface of various kinds of terrain and industrial sites such as refineries. Such anomalies may include, for example, pipeline leaks, voids, ruptures, water system leaks, fractures of vessels, housings, or pipelines or tubing or other lines. A combination of visual, infrared thermographic and subterranean referencing sensors, such as by the use of ground penetrating radar, to detect one or more anomalous defects, voids or leaks.

The hierarchy is initiated by the use of visual reference and application of infrared thermography or other image analysis when a leak, erosion void, or other subterranean anomaly is suspected, the hierarchical system is initiated by carrying out infrared thermography of the surface overlying the suspected anomaly. This involves scanning a selected area by infrared thermography, most preferably, for one or more locations above the surface of the area, including the suspected anomaly, to identify from two-dimensional thermographic area data of the surface of said area, the likely existence of such an anomaly signal by the thermographic data. Such thermography can be carried out from a number of locations, including as by scanning by helicopter or other aircraft at altitudes of up to 12,000 feet or more, a method which is employed to advantage in traveling along and above a pipeline which may extend for many miles. Alternatively, over a combined area, a tower or bucket truck or crane, or location on an adjacent roof, or the use of a vehicle as proposed in Weil U.S. Pat. No. 4,910,953 (identified above) wherein such vehicle or minivan may be provided with a lift to give a suitable height such as 15 feet, from which satisfactory thermography may be carried out.

The infrared thermographic screening carried out as above may be within a well-defined area, or may be carried out as a more generalized area scan, such as for global pre-screening of an area in which it is suspected there may be subterranean anomalies, as in the case of a sewer line or pipeline in a chemical processing plant or refinery which line may extend for many thousands of feet.

Under any circumstances, the infrared thermography first procedure looks for surface indications of one or more anomalies, that is to say, thermal anomalies on the surface which signal or tend to indicate the existence of an anomaly in question. Such surface thermal anomalies connote the likelihood of a subterranean anomaly.

In methodology according to the prior art, it has been practice to excavate along a sewer line over substantial distances, including hundreds or thousands of feet, and digging out the line within a corridor. Such has required weeks, months or years of careful, painstaking excavation to uncover the line in question, and with the result of producing horrible and disruptive damage to terrain with the consequent interruption of activities and interference with nearby work and structures, all at a cost running into millions of dollars per project.

The present invention involves a much more incisive approach beginning with visual, pre-screening and specific infrared thermography over the suspected subterranean anomaly. If only thermal anomalies at the surface are noted, excavation has heretofore proceeded by drilling a hole or excavation at the site of the thermal anomaly, as by digging and drilling, but even this is not as desirable as use of the methodology herein proposed, which allows a far more precise identification as remediation of an anomaly.

In the case of refineries, as a special case, various lines, sewers and conduits are routed in sometimes direct and sometimes indirect and even very convoluted manner, and at various depths, from location to another, and may be overlaid with other conduits or lines. The term "lines" may be used to identify all such conduits, and may be of diameters from an inch, for example, to ten feet in diameter, for example. It has been the practice in some locations having relatively large diameter lines to use so-called pigs or to use ultrasonic devices or cameras which travel through the line. These are not found in general to be satisfactory in all situations because of the sometimes abrupt changes in geometry resulting from location of the lines. Pigs and mechanical devices also are not successfully used in lines that have internal diameters which are too small or which otherwise interfere with such devices, presenting the risk that such a pig, for example, may become lodged in a line, requiring excavation and retrieval of the pig by breaking open the line.

It is also an advantage in the use of infrared thermography that various kinds of chemicals, isotopes, compounds, and chemical substances can be detected more accurately and with advantageous speed. In general, the use of infrared thermography as an initial procedure in a system according to the invention provides the lowest cost per square unit of area measurement as compared to prior technologies while achieving a more accurate identification than previous technologies.

The signature of thermal anomalies on the surface is often indicative of the nature of a leak. For example, in a pipeline leak, the infrared thermography data, when examined with care, may depict a plume which shows a temperature associated with a particular fluid, such as oil, water, process chemical, or many of a wide variety of substances.

FIG. 1A is indicative of the procedures in obtaining infrared thermography data. As visual and thermographic data are captured, the data are stored for display and later use including analysis and correlation with ground penetrating radar data. FIG. 2 is a multiplexed simultaneous computer screen display of infrared thermography data, ground penetrating radar data, and site and other data, as such data displayed after its collection and during or after storage. FIG. 2 shows not only visual data (left image), as captured by video camera, as well as infrared thermographic signature (right upper image) of an area in which there is thermographic indication of a surface temperature anomaly which connotes the existence of a leak or other subterranean anomaly. Additional data describing the site at which the data was taken, is captured in FIG. 2 as the lower right image panel.

FIG. 1A has two related upper and lower tracks or levels, the upper track being a flow chart line, and the lower track being the corresponding procedures track. Referring to the upper track of FIG. 1A, blocks 10, 12, 14, 16 and 18 generally indicate procedure designed to locate and field mark surface temperature patterns indicative of subsurface fluid leaks including water, sewage, natural gas, other gases, hydrocarbons, and chemicals along with their erosion voids. Block 10 shows data input sensors, block 12 indicates data display, block 14 represents data storage provision, block 16 represents data analysis, and block 18 is indicative of field anomaly marking. Blocks 20, 22 and 24 represent detection, mapping, characterizing, and field marking of anomalous areas for leak sealing, erosion void filling, and saturated soil stabilization. Block 20 represents field mark grid provision for ground penetrating microwave radar (as abbreviated in this disclosure as GPR or GPMR) and associated ground penetrating radar data collection. Block 22 shows GPMR data analysis using three dimensional (3D) software, which may be of known type, by which the data can be represented for computer display as a 3D figure and can be viewed or printed as "slices" of data at the several discrete depths at which the data is obtained, as shown in FIGS. 4A through 4E which are actual and representative ground penetrating radar data images realized from the microwave radar reflections returned from subterranean media, being 3D data of subterranean media in which there are anomalies.

In FIG. 1A, the corresponding lower track shows method steps or procedures 102 through 122, which correlate to blocks 20 through 24. Step 102 represents obtaining visual imagery data to insure, i.e., determine definitively, ground surface conditions. In step 104, there is shown using the infrared imagery data to locate surface thermal patterns indicative of subsurface pipeline leaks, erosion voids and wet materials, i.e., wet substances which may be of subsurface origin, while step 106 shows using ground penetrating microwave radar data to locate subsurface dielectric conditions indicative of erosion voids and saturated subsurface materials. Step 108 shows providing input of text information (descriptive information), location description; reference distance; GPS information, date, time and so forth. The data or information obtained in steps 102, 104, 106 and 108 is provided, as shown at step 110, to a quad multiplexer which synchronizes ("syncs") all data for individual or simultaneous display on a computer or video display monitor using quad type software, which may be of known type, to provide display as in FIG. 2.

Then, step 112 shows providing such data/information in analogue or digital form for storage to magnetic videotape or magnetic disc computer hard drive or disc, or video cassette recorder or optical disc.

Step 114 shows that the procedures may be manual or automated using written code software and/or neural network or hardware and/or software.

Step 116 shows the use of paint to field mark the center and edges of all surface temperature anomaly patterns, while step 118 shows the example of painting a 10–20 ft.×10–20 ft. grid pattern centered on the center of the anomaly. Step 120 shows the use 3D GPMR data analysis software, as described above, to visualize data illustrating subsurface solid areas, voids, and saturated materials. Step 122 represents adding paint marks locating void centers.

The upper and lower paths of FIG. 1A continue in FIG. 1B. There block 26 shows the procedure of low pressure grout injection into the detected subterranean void. A corresponding low pressure grout injection procedure is represented at 124. Step 26 is followed in step 28 by field repeating of the visual data, infrared imaging, text input and data collection. A quality control loop by which the procedure may be repeated as necessary is designated at 30. Corresponding procedure is shown at 102' involving obtaining visual imagery data to insure, i.e., definitively be sure of, ground surface conditions. So also 104' shows using the infrared imagery data to locate surface thermal patterns indicative of subsurface pipeline leaks, erosion voids and wet materials, being the same procedure as at 104. Correspondingly, at 108' there is again shown providing input of text information (descriptive information), location description; reference distance; GPS information, date, time and so forth, as procedures to be taken with those shown in 102' and 104' following low pressure grout injection.

Injection of grout at a pressure at least as great as that used for low pressure grout injection, and more typically or preferably at a higher injection pressure, is shown by block 32 and corresponding method designation 126 referred to as high pressure grout, as more fully discussed elsewhere in this disclosure. Step 32 is followed by step 34 by field repeating of the visual data, infrared imaging, text input and data collection. A quality control loop by which the procedure may be repeated as necessary is designated 36. Corresponding procedure is shown at 102' involving obtaining visual imagery data to insure, i.e., definitively be sure of, ground surface conditions (being the same kind of procedure as at 102). So also 104' (being the same kind of procedure as at 104) shows using the infrared imagery data to locate surface thermal patterns indicative of subsurface pipeline leaks, erosion voids and wet materials. Correspondingly, at 108' again there is illustrated the procedure of providing input of text information (descriptive information), location description; reference distance; GPS information, date, time and so forth.

A general discussion of variations and various factors will be helpful.

In the pre-scanning or scanning of an area which is believed to contain a subterranean anomaly, infrared thermography may be carried out by the use of a single point scanner providing extreme accuracy; and so also, use is contemplated of infrared images and infrared radiometers as well as infrared cameras. Single point or multiple point scanning may be employed to obtain the two-dimensional thermographic data required to show the existence of anomalous thermal variations in the surface overlying the area of the suspected anomaly from which it may be inferred the longitude and latitude of the anomaly or what can be considered x-y location. Although the infrared thermography provides highest confidence in such location, it may suffice in some circumstances to employ video cameras to record anomalous areas, and such video or still cameras can be used for adjunct or pre-screening or to provide original grade level indication of anomalies. Thus, it may be useful in some circumstances to obtain a visual image of the area by such means including film and digital cameras or video cameras or sensors. Precision odometer, laser surveying, and/or GPS data may be used for precise location of leak-suspicious surface areas.

The system captures infrared and/or visual images (such as from IR scanners, imagers, cameras or radiometers, including video or other digital or photo cameras and video camera images) and such data is preferably simultaneously successively recorded on videotape together with related location data (such as odometer or GPS data) and other relevant information such as descriptions, locations and other geologically-relevant information of a site, and so also precise time of day. A combination of infrared, video and location data and other relevant data, is selectively captured on successive frames. Said Weil U.S. Pat. No. 4,910,593 is illustrative of the recording of multiple forms of such data.

Ground penetrating radar (GPR/GPMR), as here employed is herein disclosed for high-resolution, subterranean investigation to depths sufficient for including suspected subterranean anomalies to acquire information regarding the vertical extent of one or more subterranean anomalies of an area in question. Microwave energy of the GPR is propagated from grade level into subterranean geologic media for points over subterranean anomalies that are signaled by the visual data obtained as through infrared thermography data previously taken. The anomalies may vary widely. They may be one or more leaks, faults, structures, pipelines, sewer lines, conduits, fluid-saturated areas from leaks, or any other anomaly of interest. The transmitted microwave radiation is reflected from such anomalies to receiving elements of the GPR sensors by subsurface boundaries or regions having contrasting electrical properties characteristic of the interface between normal media and strata, and normal structures and lines, on the one hand, and fluid-saturated leak regions, on the other hand.

Before systematically employing GPR to investigate the area in question, an area-specific investigation matrix (i.e., a grid or map) is prepared, such as showing points of a grid spaced evenly apart (e.g., at 1.0 ft. increments) at which GPR data will be taken. GPS and other precision location data may be recorded and taken into consideration. GPR is then carried out in systemic manner at such points using preselected frequency or frequencies (e.g., as operating at microwave frequencies), ranges of depth, antenna(s), degree of resolution, and power levels, all as appropriate for the depth and accuracy to be obtained. The establishing of a grid in that manner on the surface of the selected area for the use of GPR need only encompass such potions of the selected area as will be highly likely include the anomaly which has been signaled by the thermographic data.

Then, using such GPR to penetrate subterranean media to a sufficient depth as is expected to include the suspected anomaly or anomalies, radar data is captured to provide from the microwave reflections from such media a set of vertical dimension radar data of the area.

FIG. 2 shows the establishing of such a grid within the area of investigation.

The GPR data is preferably taken in the form of three-dimension depth slices showing the vertical extent (depth) and so also horizontal extent, of the subterranean anomaly. Such three-dimensional depth slices may be taken in the form of the raw data radar returns and thereafter converted by use of available software into three-dimensioned depth slices to be displayed according to the preferred mode as graphically depicted depth slices.

FIGS. 4A–4E are illustrative of depth slices of an investigative site.

The system procedure then involves correlating the demographic data with the radar data to verify the existence of each such anomaly and to specify its vertical dimension, as well as to determine a central location within the anomaly in question. This correlation of demographic and radar data allows then the procedure of determining a volume of the anomaly on the basis of the vertical dimensions and (z-axis) and the x-y thermographic area data. That is, in simple terms, the correlated data provides both vertical and horizontal dimensions of a void, a leak area, or an anomalous condition which is to be remediated.

In that manner, the geological extent of the leak within the subterranean medium is determined, including identification of variable density areas which may represent soils which have become saturated by liquids leaking from, for example, a pipeline or a sewer leak. FIG. 4 is illustrative of data showing such a leak area.

It is useful to consider the nature of a leak. Typically, fluids from leaching into soil media from a pipeline, as a prime example, may leak out repeatedly, only to be drawn partly back into the line, including fines from the media which are entrapped in the leaking fluid. In that way, a void or saturated area is created over time through a mechanical effect as soil media is dissolved or carried with the hydrostatic effect or movement of the leaking fluid. Such leaks worsen over time. Such a chronic and ever-worsening condition compels early remediation to avoid even more damage, including the possibility of expensive collateral damage from an enlarging area of leakage.

Heretofore, traditional excavation has been carried out at substantial cost and risk. Such excavation not only causes collateral damage to other structures and nearby operations, but is imprecise in that it fails to tell the true extent of a leak before trenching is begun. If then the excavation of a leak area in which traditional excavation is carried out has been incorrectly determined, further excavation typically must follow along the length of the pipe or conduit until a leak is found. This may require hundreds or thousands of feet or even miles of excavation because of the tendency of leaking fluids to extend over substantial distances.

In such conventional remediation, repairs have been sometimes carried out by adding collars or welded structures to pipelines. Another known technique has been to pump in concrete for purposes of surrounding a pipeline to effect repair, but such a technique presents many problems. For example, the concrete may rupture a line or even fill a line with concrete and, thus, may not only fail to repair the void but additionally cause a difficulty or obstacle to further repair in that concrete which has entered the line itself constitutes a blockage which must be taken care of. In such a situation, a repair or "fix" may be worse than the problem for which it is intended to be a solution.

According to the present system, once the volume of the anomaly has been determined, it is preferred to employ remediation involving the injection of a grout. Many possible grouts may be employed, for example, acrylimide, acrylate and urethane grouts of commercial type may be used. A urethane grout is especially preferred.

FIG. 1B shows procedures of injecting grout into the site of the anomalous leak and its void cavity or cavities. In injecting grout into the anomaly, remediation according to the present procedure is most preferably carried out by injecting the grout into a central location of the anomaly (such as in immediate proximity to a leaking pipeline). The grout, most preferably, may be repellant to any substance leaking into the anomaly. For example, urethane not being miscible with water leaking from the pipeline, will remain in situ if injected at a first low pressure sufficient for injecting the grout by causing it to surround the central location of the anomaly, as in the manner of a bandage which wraps around the leaking line. A preferred first pressure is accordingly a low value such as 1–2 psig, which is not prone to cause damage or collapse of the line or to enlarge holes therein. In using the preferred grout (e.g., urethane), the grout may be provided by a fluid which results in the formation of a foam in situ according the approximate relationship of one part of liquid producing four parts of foam, by volume. In the foregoing manner, the grout under low pressure fills the area immediately adjacent to a leaking line (such as a pipeline or sewer) and encases it with a bandage-like effect to protect the line in question. Having injected the grout into the central location of the anomaly, it is then preferred to carry out scanning of the area, as by infrared thermography, to verify that the anomaly has been centrally secured in that no further leakage is taking place.

At this point, if the amount of grout so injected has not caused termination of leakage, additional grout at low pressure may continue. In any event, when the anomaly has been centrally secured, the system now employs a further grouting procedure. Specifically, the preferred grout is injected into the region of the anomaly at least at the same pressure or at a second pressure higher than the first pressure so that the total amount of grout within the anomaly approximates the predetermined volume of the anomaly. In this second introduction of grout, it is preferred to employ a pressure such as at least 1–2 psig but more preferably 2 psig or more or a pressure, for example within the general range of 2–10 psig, but most preferably or exemplarily at about 5 psig, so that the grout as further injected will fill and solidify saturated soils within the area immediately encompassing the anomaly. In that regard, soil media which has been thoroughly wetted by an existing leak takes on an oatmeal-like texture which is typified as a colloidal suspension of particulates within fluid, yet surrounded by dry soils. Grout at the higher pressure is carefully introduced until, as injection continues, a pressure rise is observed. Such rise in pressure is indicative of a sufficient total amount of volume of grout having been injected. At that point, injection of grout must be terminated in order to prevent further grout injection, which may result in collateral difficulties such as collapse of a line or bulging of soil at grade level.

The secondary introduction of grout at a higher pressure pushes out water or other fluid from the soil media surrounding the anomaly and solidifies and stabilizes the volume in which the grout has been introduced. In this regard, it is important to emphasize that voids are often highly variable in size and extent, and may have a highly fragmented character. They are not typically well-defined, large or contiguous "holes" but rather fragmented runners, passages and interstices. Grouting at the higher pressure introduces grout into these various voids and passages and so, as it hardens, strengthens and stabilizes less dense areas within the treated region.

Following remediation in accordance with the foregoing procedures, infrared data and/or other imaging may be carried out within the area of the anomaly in order to obtain verification of the remediation procedures but this is not believed to be a necessary procedure because the temperature in the immediate vicinity of the anomaly, although repaired, may remain elevated because of the exothermic reaction caused by the grouting, which may take many hours or even a few days (such as a week) to stabilize.

In summary, is seen from the foregoing that the Improved System is, in one aspect, a methodology and an integrated system of identification, verification and remediation of leaks, voids and other subterranean anomalies, any one of more (as well as combinations) of such conditions being more simply termed herein "anomalies."

From a method perspective, the Improved System comprises method or process of identification, verification and remediation of leaks, voids and other subterranean anomalies, comprising:

(a) scanning a selected area, as by infrared thermography, from one or more locations above the surface of said area to identify from two-dimension thermographic area data of the surface of said area the likely existence of such an anomaly signaled by the thermographic data;

(b) establishing predetermined locations on a surface of the selected area for use of ground penetrating radar, such locations being in such portions of said selected area as will include such an anomaly signaled by the thermographic data;

(c) using the ground penetrating radar to penetrate a subterranean extent with microwaves to a depth as will include such an anomaly to create from subterranean microwave a set of vertical dimension radar data of the area;

(d) correlating the thermographic data with the radar data to verify the existence of such anomaly and its vertical dimension and to locate a central location within the anomaly;

(e) determining a volume of the anomaly on the basis of the two-dimension thermographic area data and the vertical-dimension radar data;

(f) injecting into the central location of the anomaly a grout which while inert to contaminants leaking from the anomaly will react with the moisture in any substance leaking into or causing the anomaly, wherein the grout is injected at a first pressure for securing the source of the anomaly;

(g) repeating step (a), if necessary, to verify that the anomaly is centrally secured; and (h) when the anomaly is centrally secured, injecting into the region of the anomaly grout at a second pressure, at either a similar pressure or higher than the first pressure so that the amount of grout within the anomaly approximates the predetermined volume of the anomaly.

Optionally, after step (a) and before step (b), or else after step (c) but in any event before step (f), invasive and destructive boring and sampling techniques can be used, if desired, within the selected area, as in the case of possible plural anomalous areas, to further analyze and confirm the general nature of leakage and other anomalous conditions.

From a system-related or apparatus perspective, the invention is seen to provide a system identification, verification and remediation of leaks, voids and other subterranean anomalies, comprising:

visual scanner means for visually scanning a selected area having suspected subterranean anomalies from which one or more contaminants may be leaking, as by infrared thermography, from one or more locations above the surface of said area to identify from two-dimension surface area data the likely existence of such an anomaly signaled by said data;

means for predetermining locations on a surface of the selected area for use of ground penetrating radar, such locations being in such portions of said selected area as will include such an anomaly signaled by the thermographic data;

ground penetrating radar for transmitting radio frequency signals from said locations to penetrate a subterranean extent of such area with the transmitted radio frequency signals to a depth as will include such an anomaly to create from subterranean microwave a set of vertical dimension radar data of the area;

provision for correlating the thermographic data with the radar data to verify the existence of such anomaly and its vertical dimension and to locate a central location within the anomaly; and for determining a volume of the anomaly on the basis of the two-dimension thermographic surface area data and the vertical-dimension radar data;

a grouting substance inert to contaminants leaking from the anomaly will react with the moisture in any substance leaking into or causing the anomaly, wherein the grout is injected at a first pressure for securing the source of the anomaly;

grout injection provision for injecting the grout into the central location of the anomaly at a predetermined pressure; and pressure monitoring means for monitoring the pressure as the grout is injected.

In addition, various other features are used to advantage in the system combination, and may include the following:

a video camera for scanning such a geological area;

mobile carrying means on which said infrared scanner and said video camera are fixable for movement relative to such geological area while scanning;

location indicator means such as will provide GPS data and/or odometer, including also profilometer, for data recordation to be recorded with the surface thermographic data, the location indicator means comprising means for providing location data uniquely representative of locations of the surface area within fields of view;

laser locators or pointers for marking locations on the area surface on which infrared thermography is carried out;

video camera and video recordation equipment for providing video recordation of the area surface on which infrared thermography is carried out;

when using infrared thermography, as by infrared camera, scanner or the like, provision for aligning such video camera with infrared data capturing devices so as to provide related coincident or overlapping fields of view; and/or data processing and preservation means, such as in the form of dynamic memory and/or nonvolatile memory, as by way of digital disk drives and/or CD-ROM or data cartridges;

and such data processing and preservation means may include facility for continuously capturing infrared, video images, location data and GPR data on composite video or digital storage frames, and for simultaneously selectively monitoring the infrared and video images, location data and GPR for verification and processing for further use.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A method of identification, verification and remediation of subterranean anomalies comprising:
   obtaining surface thermography data of the surface above an anomaly to obtain area image data inferring the existence of the anomaly;
   penetrating subterranean media beneath the surface by microwave radiotransmission to obtain subterranean data confirming the existence of the anomaly and to determine its depth;
   correlating the surface data with the subterranean data to determine the centroid of the anomaly and to determine the volume of the anomaly;
   injecting a grout into the centroid of the anomaly at the centroid of the anomaly for initial sealing of the anomaly; and
   injecting additional grout into the anomaly until the total amount of injected grout approximates the volume of the anomaly.

2. A method of identification, verification and remediation of subterranean anomalies, comprising:
   (a) scanning a selected area by imaging from at least one location above the surface of said area to obtain two-dimension thermographic surface area image data inferring the likely existence of such an anomaly signaled by the image data;
   (b) establishing points on the surface of the selected area for use of ground penetrating radar, the points encompassing such portions of said selected area as will include such an anomaly;
   (c) using ground penetrating radar at said points to penetrate a subterranean extent with radar signals to a depth as will include such an anomaly so as to create from subterranean radar returns a set of radar data of the area;
   (d) correlating the surface image with the radar data to verify the existence of such anomaly and its vertical dimension and to determine a central location within the anomaly;
   (e) determining a volume of the anomaly on the basis of the two-dimension thermographic area data and the vertical-dimension radar data;
   (f) injecting into the central location of the anomaly a grout which combines to any substance leaking into the anomaly, wherein the grout is injected at a first pressure for securing the anomaly by surrounding its central location;
   (g) repeating step (a), if necessary, to verify that the anomaly is centrally secured; and
   (h) when the anomaly is centrally secured, further injecting into the region of the anomaly grout at a second pressure at least as great as the first pressure until the total amount of injected approximates the predetermined volume of the anomaly.

3. A method of identification, verification and remediation of leaks, voids and other subterranean anomalies, comprising:
   (a) scanning a selected area by infrared thermography from one or more locations above the surface of said area to identify from two-dimension thermographic area data of the surface of said area the likely existence of such an anomaly signaled by the thermographic data;
   (b) establishing a grid on surface of the selected area for use of ground penetrating radar, the grid encompassing such portions of said selected area as will include such an anomaly signaled by the thermographic data;
   (c) using such ground penetrating radar to penetrate a subterranean extent with microwaves to a depth as will include such an anomaly to create from subterranean microwave a set of vertical dimension radar data of the area;
   (d) then correlating the thermographic data with the radar data to verify the existence of such anomaly and its vertical dimension and to locate a central location within the anomaly;
   (e) determining a volume of the anomaly on the basis of the two-dimension thermographic area data and the vertical-dimension radar data;
   (f) then injecting into the central location of the anomaly a grout which while inert to contaminants leaking from the anomaly will react with the moisture in any substance leaking into or causing the anomaly, wherein the grout is injected at a first pressure for securing the source of the anomaly;
   (g) repeating step (a), if necessary, to verify for quality control or assurance that the anomaly is centrally secured; and
   (h) when the anomaly is centrally secured, injecting into the region of the anomaly grout at a second pressure, at either a similar pressure or higher than the first pressure so that the amount of grout within the anomaly approximates the predetermined volume of the anomaly.

4. A method as set forth in claim 3 further comprising, after step (a) and before step (f), carrying out invasive and destructive boring and sampling techniques within the selected area, as in the case of possible plural anomalous areas, to further analyze and confirm the general nature of leakage and other anomalous conditions.

5. A system for providing identification, verification and remediation of leaks, voids and other subterranean anomalies, comprising:
   visual scanner means for visually scanning to obtain thermographic data of a selected geographic area having suspected subterranean anomalies from which one or more contaminants may be leaking, from one or more locations above the surface of said area to identify from two-dimension surface area data the likely existence of such an anomaly signaled by said data;
   means for predetermining locations on a surface of the selected area for use of ground penetrating radar, such locations being in such portions of said selected area as will include such an anomaly signaled by the thermographic data;
   ground penetrating radar for transmitting radio frequency signals from said locations to penetrate a subterranean extent of such area with the transmitted radio frequency signals to a depth as will include such an anomaly to create from subterranean microwave a set of vertical dimension radar data of the area;
   provision for correlating the thermographic data with the radar data to verify the existence of such anomaly and its vertical dimension and to locate a central location within the anomaly; and for determining a volume of the anomaly on the basis of the two-dimension thermographic surface area data and the vertical-dimension radar data;
   a grouting substance inert to contaminants leaking from the anomaly but that will react with the moisture in a substance leaking into or causing the anomaly, wherein the grout is injected at a first pressure for securing the source of the anomaly;

grout injection provision for injecting the grout into the central location of the anomaly at a predetermined pressure;

pressure monitoring and controlling means for monitoring and controlling the pressure as the grout is injected; and quality control procedures at least after grout injection for assurance that the anomaly is secured.

6. A system as set forth in claim 5 wherein the visual scanner means comprises infrared thermography means for obtain the thermographic surface data of the selected area, wherein the thermographic surface data infers the existence of such anomaly.

7. A system as set forth in claim 5 wherein the visual scanner is a digital camera or photo camera.

8. A system as set forth in claim 5 further comprising a video camera for capturing video images of such geological area coincident with infrared thermography data of such geological area.

9. A system as set forth in claim 8 further comprising a mobile carrying means on which said infrared scanner and said video camera are fixable for movement relative to such geological area when scanning thereof is carried out.

10. A system as set forth in claim 9 further comprising recordation equipment for providing recordation of infrared thermographic data and video data the area surface on which infrared thermography is carried out.

11. A system as set forth in claim 5 further comprising location means to provide precision location data of said geological area when scanning.

12. A system as set forth in claim 5 further comprising laser locators or pointers for marking locations on the geological surface area on which infrared thermography is carried out.

13. A system as set forth in claim 5 further comprising data processing and preservation means for simultaneously selectively storing geologic surface area, infrared and video images data, location data and GPR data for verification, processing and for further use.

14. A system for identification, verification and remediation of subterranean anomalies of the type represented by leaks and voids, the system comprising:

provision for obtaining visual imagery data indicative of ground surface conditions in a selected area in which such an anomaly may exist, the area image data inferring the existence of an anomaly by surface thermal patterns indicative of such an anomaly;

a protocol to locate and field mark surface temperature patterns indicative of subsurface fluid leaks or erosion voids of such an anomaly;

a protocol to provide a pattern of predetermined points on said ground surface for the taking of ground penetrating radar data for subterranean location of such an anomaly;

ground penetrating radar for obtaining such radar data by positioning a radar unit or units at the predetermined points on the surface to penetrate a subterranean extent of the area with radar signals to a depth to include such an anomaly in question by radar signals which locate subsurface dielectric conditions indicative at least of erosion voids and saturated subsurface materials so as to create from radar returns a set of vertical dimension in the form of three-dimensional data showing anomaly depth and shape;

provision for display to a system user of the surface image data and ground penetrating radar data by making it available for individual or simultaneous display on a computer or video display monitor together with display of location and other data indicative at least of when the data is obtained and a site from which it is obtained;

data storage provision for storing of the visual data, radar data and other data in analog or digital format for use;

an analysis and correlation protocol, either manually implemented or automatically-implemented, or both, for analyzing the stored visual data, radar data and other data, and for correlating the visual data with the radar data to verify the existence of such anomaly and its vertical dimension and to determine a centroid of the anomaly, and to predetermine the volume of the anomaly, such as a void or defect, or fluid-infiltrated region, on the basis of visual data and the radar data and so as to visualize subsurface solid areas, voids, and saturated materials associated with such anomaly;

a protocol for field marking for said surface of void centroids associated with such anomaly;

grout injection provision for injection of grout at a monitored and controlled first preselected low pressure into a void centroid to form a healing bandage over and around any leak associated with such an anomaly so as to seal such leak;

quality control protocol for rechecking of any such leak, including repeat of visual data collection of the area, in order to determine that any such leak is sealed, whereby to verify that such anomaly is centrally secured; and grout injection provision for grout injection by which grout is further injected into the region of the anomaly grout at a monitored and controlled second preselected pressure, wherein the second pressure selection is a pressure at least as great as the first pressure, until the total amount of injected approximates the predetermined volume of such anomaly.

15. A system as set forth in claim 14 wherein said provision for obtaining visual imagery data comprises means for carrying out infrared thermography of ground surface conditions in said selected area to obtain thermographic image data inferring the existence of such anomaly by variation in surface thermal patterns indicative of such an anomaly.

16. A system as set forth in claim 15 wherein by said analysis and correlation protocol the radar data and thermographic image data are analyzed, and wherein the thermographic image data and radar data are correlated such that each subsurface void is visualized and determined to have a centroid having a measured distance below a centroid grade marker.

17. A system as set forth in claim 16 wherein the grout injection provision includes means for measuring pressure at which grout is injection, and wherein as grout is injected at the second pressure, grout injection is continued until a pressure rise is observed during injection, and whereby such rise in pressure is indicative of a sufficient total amount of volume of grout having been injected so as to permit injection of grout to be terminated.

18. A system as set forth in claim 14 further comprising location means to provide precision location data of said geological area when scanning.

19. A system as set for the in claim 14 further comprising locators, markers or pointers for marking locations on the geological surface area on which infrared thermography is carried out.

20. A system as set forth in claim 14 wherein the data storage means comprises data processing and preservation means and for simultaneously selectively storing on electronic, magnetic or optical media geologic surface area, the infrared and video images data, location data and the ground penetrating radar data for subsequent verification, correlation, processing, display or other use.

21. A system as set forth in claim 14 wherein the grout is selected from the group comprising acrylimide, acrylate and urethane grouts.

* * * * *